United States Patent [19]

Verbicky, Jr. et al.

[11] Patent Number: 4,622,368

[45] Date of Patent: Nov. 11, 1986

[54] PLASTICIZED POLYETHERIMIDE BLENDS

[75] Inventors: John W. Verbicky, Jr., Scotia; Elbridge A. O'Neil, Port Henry, both of N.Y.

[73] Assignee: General Electric Company, Schenectady, N.Y.

[21] Appl. No.: 733,433

[22] Filed: May 13, 1985

[51] Int. Cl.$^4$ ...................... C08F 283/04; C08L 77/00
[52] U.S. Cl. .................................. 525/426; 525/432; 524/401
[58] Field of Search ................. 525/426, 432; 524/401

[56] References Cited

U.S. PATENT DOCUMENTS

| | | | |
|---|---|---|---|
| 4,107,125 | 8/1978 | Lovejoy | 525/432 X |
| 4,110,294 | 8/1978 | Pickering et al. | 525/426 X |
| 4,141,927 | 2/1979 | White et al. | 525/432 |
| 4,168,366 | 9/1979 | D'Alelio | 525/426 |
| 4,302,575 | 11/1981 | Takekoshi | 528/185 |
| 4,365,034 | 12/1982 | Grimes et al. | 525/426 X |
| 4,387,192 | 6/1983 | Yonezawa et al. | 525/426 |
| 4,468,506 | 8/1984 | Holub et al. | 525/432 |
| 4,579,914 | 4/1986 | Nelb et al. | 525/432 X |

OTHER PUBLICATIONS

P. J. Dynes et al., *Polyimides*, vol. 1, pp. 311-326, K. L. Mittal, Ed. Plenum Press.

L. H. Sperling and D. A. Thomas, *Polymer Blends*, D. R. Paul and S. Newman Eds., Academic Press, N.Y., 1978.

*Primary Examiner*—Lucille M. Phynes
*Attorney, Agent, or Firm*—James Magee, Jr.; James C. Davis, Jr.

[57] ABSTRACT

This invention is concerned with a method for plasticizing polyetherimide polymers with a reactive bisimide plasticizer. This invention also provides novel plasticized polyetherimide blends and rigid polyetherimide blends which are obtained by polymerizing the reactive bisimide plasticizer to form an interpenetrating matrix polymer. The plasticized blends exhibit melt viscosities and glass transition temperatures lower than those associated with the polyetherimide component of the blends. The rigid blends exhibit higher dimensional stability than polyetherimides. The blends produced are suitable for the manufacture of filaments, composites, fibers, films, molding compounds, coatings, etc.

34 Claims, No Drawings

PLASTICIZED POLYETHERIMIDE BLENDS

This invention is directed to a new class of polyetherimide blends. More particularly, this invention is directed to plasticized polyetherimide blends which can be cured to provide a rigid polyetherimide blend having a cross-linked polymer matrix embedded therein. This polymer matrix is obtained upon polymerization of a N-unsaturated alkyl bisimide of the formula

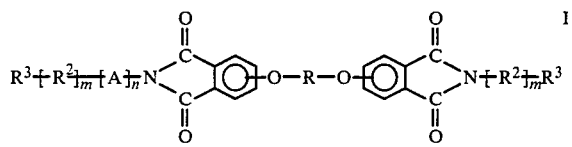

where n is a number of from 0 to 3, m is equal to 0 or 1, R is a divalent aromatic radical of from 6–30 carbon atoms, $R^2$ is a divalent organic radical selected from the group consisting of alkylene radicals of from 1–18 carbon atoms, cycloalkylene radicals of from 4–18 carbon atoms and aromatic radicals of from 6–18 carbon atoms, $R^3$ is a monovalent alkyl radical of from 2–20 carbon atoms having an unsaturated functional group selected from the group of formulas consisting of

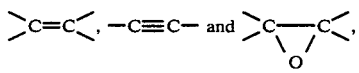

and A is of the formula

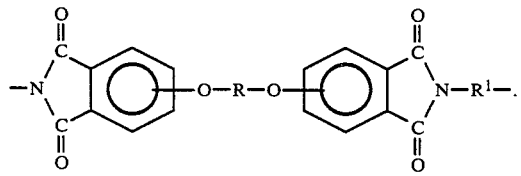

where R is as defined above and $R^1$ is a divalent radical selected from the group consisting of the aromatic radicals defined by R, alkylene radicals of from 1–20 carbon atoms, cycloalkylene radicals of from 4–20 carbon atoms and alkylene terminated polydiorganosiloxane radicals having from 2–8 carbon atoms.

Polyetherimide resins and blends thereof are known for their high heat distortion temperatures and glass transition temperatures which makes their use as coatings, molded articles, composites, etc. very attractive where high temperature resistance is desired. These resins find particular utility as wire enamels and similar electrical insulators. Due to their high glass transition temperature and high melt viscosity, polyetherimides are difficult to process into finished products. Molding, extruding, spraying and the like must be performed at high temperatures to plasticize the polyetherimide resin.

Blends of polyetherimide resin have been shown to exhibit lower melt viscosities and glass transition temperatures than polyetherimide resins alone and are typically easier to process, White et al. describe the use of a polyester to plasticize polyetherimide in U.S. Pat. No. 4,414,927. Banucci et al. describe a polyetherimide-imide phenolic resin blend which exhibits a lower melt viscosity than polyetherimide in U.S. Pat. Nos. 4,163,030 and 4,199,651, assigned to the same assignee as the present invention. To obtain a blend of polyetherimide resin, the added components must be soluble within the polyetherimide, which limits the number of suitable constituents. Another factor which limits this number is the loss of beneficial properties in forming the blend.

This invention provides a new plasticized polyetherimide blend and a method for its production wherein a substantial portion of the beneficial properties of polyetherimide are retained. In addition, the plasticizers are reactive and can be cured to provide rigid polyetherimide blends having improved dimensional stability and solvent resistance.

The plasticized polyetherimide blends of this invention comprise a homogeneous mixture of polyetherimide of the formula

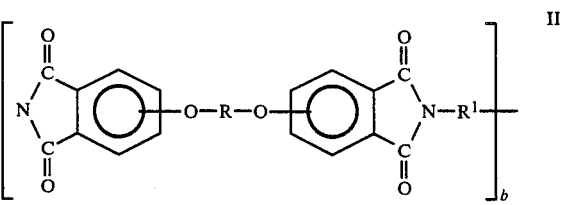

and an N-unsaturated alkyl bisimide of formula I, where b is a whole number greater than 1 and $R^1$ is as defined above.

The rigid polyetherimide blends of this invention are obtained by forming a mixture comprised of a polyetherimide of formula II and an N-unsaturated alkyl bisimide of formula I and subsequently polymerizing the N-unsaturated alkyl bisimide.

The method for plasticizing polyetherimide resin provided by this invention comprises
(a) adding to a polyetherimide resin an N-unsaturated alkyl bisimide of formula I, illustrated below once again,

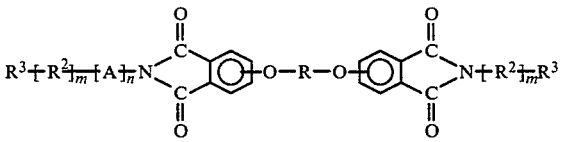

(b) heating the components of step (a) with mixing until molten.

Radicals R, $R^1$ and $R^2$ are as defined above as are the numbers m and n.

The primary object of the present invention is to improve the processing characteristics of polyetherimide resin. Another object of the present invention is to provide a plasticized blend of polyetherimide resin which will provide molded articles with improved dimensional stability and solvent resistance. Another object of the present invention is to provide a plasticized blend of polyetherimide resin which maintains a substantial portion of the high temperature resistant characteristics of polyetherimide and the engineering properties of polyetherimide. An additional object of the present invention is to provide a simple and effective method for plasticizing polyetherimide resins without detracting significantly from the beneficial properties of polyetherimide resins. Other objects of the present invention will become apparent in the discussions below.

The preferred polyetherimides and N-unsaturated alkyl bisimides are those wherein R is a member of the class consisting of

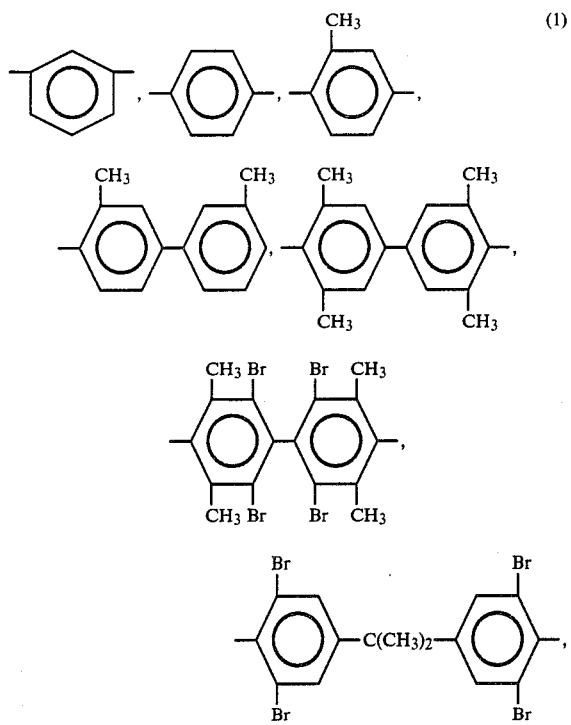

and (2) divalent organic radicals of the general formula

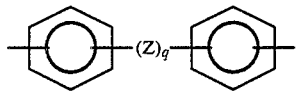

where Z is a member selected from the class consisting of divalent radicals of the formulas,

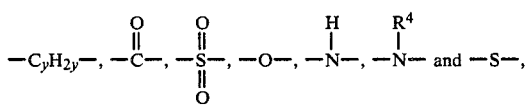

where q is 0 or 1, y is a whole number from 1–5, $R^4$ is a monovalent radical of from 1–5 carbon atoms. More preferably, the divalent radical R of both formulas I and II is of the general formula

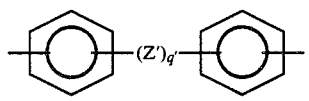

where Z' is a member of the class of divalent radicals of the formulas

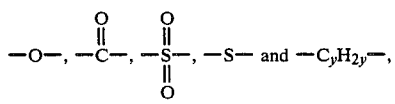

$q'$ is equal to 0 or 1 and y is as defined above. Most preferably, R is of the formula

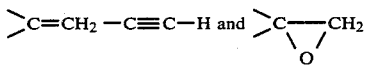

For the polyetherimides of formula II, b preferably has an average value in the range of about 20–50 and above. For the N-unsaturated alkyl bisimides of formula I, n and m are preferably equal to 0. The divalent radical $R^1$ of both formulas I and II is preferably selected from the group of aromatic species which are preferred for the divalent radical R described above and is most preferably a divalent phenylene radical. Where m is not 0, the divalent radical $R^2$ is preferably alkylene and most preferably of from 1–7 carbon atoms.

The radical $R^3$, which has an unsaturated functional group, is most commonly of from 2 to 7 branched and straight chained carbon atoms. Where m is O, $R^3$ is preferably of the formula $$-C_wH_{2w})_fX$$

where w is a whole number of from 1 to 5, f is equal to 0 or 1 and X is an unsaturated functional group selected from the group of formulas $$>C=CH_2 \quad -C\equiv C-H \text{ and } >C\underset{O}{\overset{}{-}}CH_2$$

Where m is 1, $R^3$ is preferably selected from the unsaturated functional groups of X described above. It is preferable to have the unsaturated functional group at or near the terminal portion of the radical $R^3$ to avoid interference which may result during the polymerization. However, the radicals $R^3$ are not limited to species where the unsaturated group is at the terminal portion. The most common unsaturated groups are the olefinic species $-CH=CH-$ and $-CH=CH_2$. These species are often more stable than the acetylenes and epoxides and do not retain unsaturated carbon atoms upon polymerization.

It is important to note that the radical $R^3$ may have more than one unsaturated group incorporated therein although one unsaturated group is preferred. The radical $R^3$ may also have different unsaturated groups incorporated therein.

The polyetherimides of formula II can be obtained by any of the methods well known to those skilled in the art, including the reaction of any aromatic bis(ether phthalic anhydride)s of the formula

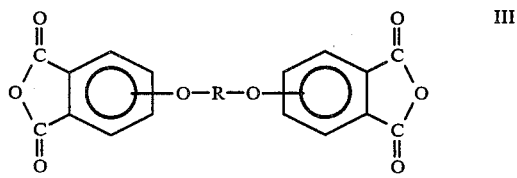

where R is as defined above, with a diamino compound of formula IV as follows: $H_2N-R^1-NH_2$, where $R^1$ is as defined above.

In general, these reactions can be advantageously carried out employing well-known solvents such as those generally known as dipolar aprotic solvents, including o-dichlorobenzene, toluene, chloroform, methylene chloride, chlorobenzene, DMSO, etc., to effect interaction between the dianhydrides and the diamines reaction. Temperatures of from about 100°–250° C. are suitable where reaction takes place in the solvent. Alternatively, the polyetherimides can be prepared by melt polymerization of the bis(ether phthalic anhydride) and the diamino compound at temperatures between about 200°–400° C. The conditions of the reaction and the proportions of ingredients can be varied widely depending on the desired molecular weight, intrinsic viscosity and solvent resistance. In general, equal molar amounts of the diamino compound and the bis(ether phthalic anhydride) are employed for high molecular weight polyetherimide. However, a slight molar excess (about 1–5 mole percent) of diamino compound can be employed to produce polyetherimides having terminal amine groups. Generally useful polyetherimides of formula II have an intrinsic viscosity greater than 0.2 deciliters per gram, preferably 0.35 to 0.60 deciliters per gram or even higher when measured in m-cresol at 25° C.

Included among the many methods for making the polyetherimides of formula I are those disclosed in U.S. Pat. Nos. 3,847,867, Heath et al., 3,847,869, Williams, 3,855,178 and 3,852,242, White, etc. These disclosures are incorporated herein by reference for the purpose of teaching general and specific methods for preparing polyetherimides suited to the practice of this invention.

The aromatic bis(ether phthalic anhydride)s of formula III include, for example, 2,2-bis[4-(2,3-dicarboxyphenoxy)phenyl]-propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride; etc.
2,2-bis(4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl-2,2-propane dianhydride; etc.

In addition, aromatic bis(ether phthalic anhydride)s included by formula III are shown by Koton et al. (Institute of Heterorganic Compounds, Academy of Sciences, U.S.S.R.), U.S.S.R. 257010, Nov. 11, 1969, Appl. May 3, 1967 and Zh Org. Khin, 4 (5), 774 (1968).

The diamino compounds of formula IV include, for example, the following organic diamines:
m-phenylenediamine;
p-phenylenediamine;
4,4'-diaminodiphenylpropane;
4,4'-diaminodiphenylmethane;
benzidine;
4,4'-diaminodiphenyl sulfide,
4,4'-diaminodiphenyl sulfone;
4,4'-diaminodiphenyl ether;
1,5-diaminonaphthalene;
3,3'-dimethylbenzidine;
3,3'-dimethoxybenzidine,
2,4-bis($\beta$-amino-t-butyl)toluene;
bis(p-$\beta$-amino-t-butylphenyl)ether;
bis(p-$\beta$-methyl-o-aminopentyl)benzine;
1,3-diamino-4-isopropylbenzene,
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane, etc.

The N-unsaturated alkyl bisimides of formula I can be obtained by any of the methods known to those skilled in the art for making polyetherimides. More particularly, they can be obtained by the reaction of a bis(ether phthalic anhydride) with an unsaturated organic amine having the organic radical $R^3$—$[R^2]_m$—, where $R^3$, $R^2$ and m are as defined above. Suitable bis(ether phthalic anhydride)s are those of formula III. Suitable unsaturated organic amines having the radical $R^3[R^2]_m$— are amines of formula V as follows: $H_2N$—$[R^2]_m$—$R^3$, wherein m, $R^2$ and $R^3$ are as defined above.

These species can react under conditions similar to those utilized to prepare the polyetherimides of formula II. The reactions can be carried out employing well-known solvents, for example, dipolar aprotic solvents including methylene chloride, o-dichlorobenzene, toluene, chloroform, chlorobenzene and the like to effect interaction between the unsaturated alkyl amine and the bis(ether phthalic anhydride). Temperatures of from about 150°–250° C. are suitable for reaction within a solvent, the limiting temperature being the vaporization temperatures of the solvent. The reaction can also take place in the absence of a solvent at temperatures between about 200°–400° C. and preferably from about 230°–300° C. Such a procedure requires effective intermixing of the ingredients to provide the necessary interaction.

The conditions of this reaction and proportions of the ingredients can vary widely depending on the N-unsaturated alkyl bisimide desired and the yield desired.

In general, a 2:1 ratio of unsaturated alkyl amine to bis(ether phthalic anhydride) is employed to provide the N-unsaturated alkyl bisimide. However, higher ratios of amine may be utilized to insure complete reaction of the bis(ether phthalic anhydride). Excess unsaturated alkyl amine can be removed more easily than excess dianhydride, particularly where the reaction takes place within a solvent.

In addition to the unsaturated alkyl amine, a small quantity of a diamino compound of formula IV may be present so as to form short chain oligomers of the bis(ether phthalic anhydride) having about four monomeric units or less. It may be desirable to introduce all of the diamino compound prior to the unsaturated alkyl amine to avoid end-capping of the dianhydride with the diamino compound. Ratios of the diamino compound to bis(ether phthalic anhydride) providing a value less than about 0.5 are preferred when the diamino compound is utilized.

Particular bis(ether phthalic anhydride)s suitable for producing the N-unsaturated alkyl bisimides include those recited above for producing polyetherimides, only a portion of which are repeated here for the sake of brevity, 2,2-bis[4-(3,4-dicarboxyphenoxy)phenyl]propane dianhydride;

2,2-bis[4-(2,3-dicarboxyphenoxy)phenyl]propane dianhydride;

4-(2,3-dicarboxyphenoxy)-4'-(3,4-dicarboxyphenoxy)-diphenyl-2,2-propane dianhydride; etc., including mixtures thereof.

The unsaturated alkyl amines of formula V having olefinic functionality include, for example, vinylamine, allyl amines such as, propenylamine and isopropenylamine, aminobutylenes such as, 2-aminoethylethylene, 1-aminoethylethylene, 1-methyl-2-aminomethylethylene, 1-methyl-1-aminomethylethylene, 1-ethyl-2-aminoethylene, 1-ethyl-1-aminoethylene, aminopentenes such as, 2-aminopropylethylene, 1-aminopropylethylene, 1-methyl-2-aminoethylethylene, 1-propyl-2-aminoethylene, etc., aminohexenes, aminoheptenes, etc.

The acetylene functionalized amines of formula V include, for example, acetylamine, methylacetylamine, ethylacetylamine, propylacetylamine, pentylacetylamine, etc. and methylamineacetylene, ethylamineacetylene, propylamineacetylene, pentylamineacetylene, etc. and methylaminemethylacetylene, methylamineethylacetylene, ethylaminemethylacetylene, ethylamineethylacetylene, propylaminemethylacetylene, etc.

The epoxy functionalized amines of formula V include, for example, epoxy ethylamine, epoxy propylamine such as, 1,2-epoxypropyl-3-amine and 1,2-epoxypropyl-1-amine, etc., epoxy butylamines such as 1,2-epoxybutyl-4-amine, 2,3-epoxybutyl-1-amine, etc., epoxy pentylamines, epoxy hexylamines, etc.

Examples of N-unsaturated alkyl bisimides produced by the organic amines of formula VI and the dianhydrides include, for example, 2,2-bis[4-phenyl-4-(N-2,3-propenyl phthalimide)ether]propane;

2,2-bis[4-phenyl-4-(N-vinyl phthalimide)ether]propane;

2,2-bis[4-phenyl-4-(N-1,2-propenyl phthalimide)ether]propane;

2,2-bis[4-phenyl-4-(N-3,4-butylene phthalimide)ether]propane;

2,2-bis[4-phenyl-3-(N-2,3-propenyl phthalimide)ether]propane;

2,2-bis[4-phenyl-3-(N-2-vinyl phthalimide)ether]propane;

2,2[4-phenyl-4-(N-2,3-propenyl phthalimide)ether)(4-phenyl-3-(N-2,3-propenyl phthalimide)ether]propane;

4,4-bis[4-phenyl-4-(N-2,3-propenyl phthalimide)ether]diphenyl;

4,4-bis[4-phenyl-4-(N-2,3-propenyl phthalimide)ether]diphenyl;

1,3-bis[4-phenyl-4-(N-2,3-propenyl phthalimide)ether]benzene;

1,4-bis[4-phenyl-4-(N-2,3-propenyl phthalimide)ether]benzene;

1,4-bis[4-phenyl-3-(N-2,3-propenyl phthalimide)ether]benzene;

1,3-bis[4-phenyl-3-(N-2,3-propenyl phthalimide)ether]benzene;

4,4-bis[4-phenyl-4-(N-2,3-propenyl phthalimide)ether]diphenyl sulfide;

4,4'-bis[4-phenyl-3-(N-2,3-propenyl phthalimide)ether]diphenyl sulfide;

4,4'-bis[4-phenyl-4-(N-2,3-propenyl phthalimide)ether]diphenyl sulfone;

4,4'-bis[4-phenyl-4-(N-2,3-propenyl phthalimide)ether]diphenyl benzophenone;

4,4'-bis[4-phenyl-3-(N-2,3-propenyl phthalimide)ether]diphenyl benzophenone;

An important feature of the N-unsaturated alkyl bisimides produced by the bis(ether phthalic anhydride)s and the unsaturated organic amines of formula V is that they are completely miscible in the polyetherimide polymers to provide the plasticized polyetherimide blends of this invention. Another key feature of the N-unsaturated alkyl bisimide plasticizers is that they maintain their reactivity within the polyetherimide polymers to form a cross-linked matrix therein and provide the rigid polyetherimide blends of this invention.

The plasticized polyetherimide blends are obtained by the method provided by this invention which comprises introducing an N-unsaturated alkyl bisimide of formula I to a polyetherimide resin and heating these components with mixing until molten. It is preferable to maintain the temperature during mixing as low as possible to prevent the polymerization of the N-unsaturated alkyl bisimides. It is also preferable to achieve mixing under an inert atmosphere such as nitrogen or argon to prevent polymerization. To obtain a homogeneous mixture, the two components must be heated to a temperature above 200° C. so as to melt the polyetherimide polymers. The preferred temperatures fall within the range of 200°-300° C. In the alternative, solutions of the two constituents may be combined and the solvents evaporated off leaving a melt mixture of the two constituents. Suitable solvents include methylene chloride, o-dichloromethane, chlorobenzene, chloroform, toluene, tetrachloroethylene, etc.

The plasticized blends obtained have a glass transition temperature below that of the polyetherimide polymers utilized. This is typically below about 200° C. and most often at a value of about 185° C. The intrinsic viscosity of the blend is also lower than that of the polyetherimide polymers.

To obtain the rigid polyetherimide blends of this invention a mixture of a polyetherimide of formula II and an N-unsaturated alkyl bisimide of formula I is formed. The N-unsaturated alkyl bisimides are then polymerized within the mixture, which is preferably homogeneous. Homogeneous mixtures can be obtained by the process comprising this invention wherein the two constituents are melt mixed. In the alternative, the mixture may be obtained by dissolving the two constituents in a common solvent and impregnating a fiber matrix (fiber glass cloth) with the solution. The solvent is then evaporated off without melting the constituents to provide a dry fiber matrix impregnated with the polyetherimide and the N-unsaturated alkyl bisimide. These matrices can be cut, stacked and heated to initiate polymerization of the bisimides. These stacked matrices can be molded when pressed together under cure temperatures and pressures of 400–600 psi.

Polymerization of the N-unsaturated alkyl bisimide within homogeneous mixtures is preferably accomplished with a heat cure wherein the homogeneous mixture is heated to a temperature above about 200° C. for a period of at least 15 minutes. Heating at such a temperature reacts the unsaturated functional groups on the N-unsaturated alkyl bisimides of formula I forming a cross-linked polymer network within the polyetherimide polymers. Polymers of varying lengths will be formed upon heating to provide a rigid composite structure within the polyetherimide polymers.

Reaction of the N-unsaturated alkyl bisimides of formula I may start upon the initial application of heat; however, significant polymerization does not take place until after about 15 minutes in the absence of a catalyst. A period of about 0.5 to 2 hours is generally preferred for complete polymerization of the N-unsaturated alkyl bisimides. Evidence of the polymerization of the N-unsaturated alkyl bisimide is the increased resistance to solvation by organic solutions, such as methylene chloride, exhibited by a portion of the blend. Reaction typically takes place at a temperature above about 200° C. and preferably within the range of about 250°–350° C. Reaction also preferably takes place in the presence of air or other oxidizing atmosphere to assist the polymerization reaction. Solvents may be present during the reaction to enhance the interaction of the N-unsaturated alkyl bisimides. Suitable solvents include methylene chloride, o-dichlorobenzene, chloroform, chlorobenzene, toluene and other dipolar aprotic solvents.

The homogeneous mixture of the two constituents may contain a peroxide or azo-catalyst to reduce the time or temperature necessary to polymerize the N-unsaturated alkyl bisimides. Typical organic peroxides suitable for catalysis are t-butyl perbenzoate, t-butyl hydroperoxide, benzopinacol, benzoyl peroxide, acetyl peroxide, cyclohexanone peroxide, perbenzoic acid, methylethyl ketone peroxide, etc. Suitable azo-compounds include

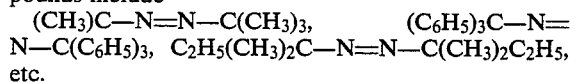
$(CH_3)C-N=N-C(CH_3)_3$, $(C_6H_5)_3C-N=N-C(C_6H_5)_3$, $C_2H_5(CH_3)_2C-N=N-C(CH_3)_2C_2H_5$, etc.

A photo-initiated polymerization of the N-unsaturated alkyl bisimides can be achieved with very thin coatings of the homogeneous mixture. A conventional free radical photo-initiator can be used, such as butyl benzoin ether. Thick coatings are undesirable due to their long cure times.

Besides a catalyst, the plasticized and rigid blends may contain fillers such as clay, silica, calcium carbonate, aluminum trihydrate, carbon black, talc, calcium sulfate, wollastonite, etc. Suitable concentrations of filler include up to 50% by weight of the total blend. These fillers can be in the form of a fiber matrix to provide a high-strength composite material upon heating the blend. The blend may also contain other additives such as flame retardants, antioxidants, impact modifiers, etc.

The ratio of N-unsaturated alkyl bisimide to polyetherimide polymer within the plasticized and rigid blends of this invention can vary widely since the N-unsaturated alkyl bisimides are completely miscible in the polyetherimide polymers. Weight ratios of N-unsaturated alkyl bisimide to polyetherimide can range from 99:1 to 1:99 within each blend. Weight ratios which approach 1:1 are generally preferred. By controlling the proportions of polyetherimide and the bisimide, plasticized blends having flow characteristics which are improved over those of polyetherimide are readily obtained. In general, the plasticized blends of polyetherimides and the N-unsaturated alkyl bisimides of formula I have substantially reduced melt viscosity values and glass transition temperatures. These properties are obtained where nominal amounts of N-unsaturated alkyl bisimide (about 10%) are combined with the polyetherimide. The rigid polyetherimide blends retain a substantial portion of the physical and chemical property profiles associated with polyetherimides. In addition, the rigid blends exhibit improved dimensional stability and solvent resistance due to the polymer network formed by the N-unsaturated alkyl bisimides.

The following examples illustrate certain embodiments of this invention, including particular polyetherimide blends. It is not intended to limit the scope of this disclosure to the embodiments described.

EXAMPLE 1

A non-homogeneous mixture of 4.5 grams of polyetherimide resin (Ultem ® polyetherimide resin) and 5 grams of 2,2-[4-phenyl-4-N-2,3-propenyl phthalimide ether]propane were heated with mixing at 310° C. for 10 minutes under a nitrogen atmosphere. The resulting homogeneous mixture showed a glass transition temperature of 185° C. for a substantially pure Ultem ® polyetherimide resin, which showed an original glass transition temperature of 217° C. This plasticized polyetherimide blend was fully soluble in methylene chloride after its preparation. Heating the plasticized blend at 290°–300° C. for two hours in the presence of air produced a rigid polyetherimide blend which exhibited a glass transition temperature of 190° C. Of the rigid blend produced, 11% was found to be insoluble in methylene chloride. This quantity corresponded to the portion of polymerized N-unsaturated alkyl bisimide described above.

EXAMPLE 2

A non-homogeneous mixture of 2.5 grams of polyetherimide resin (Ultem ® polyetherimide resin) and 2.5 grams of 2,2-[4-phenyl-4-(N-2,3-propenyl phthalimide)ether]propane were heated with mixing at 310° C. for 10 minutes under a nitrogen atmosphere. The resulting homogeneous polyetherimide blend showed no glass transition temperature by differential scanning calorimetry. Production of a rigid polyetherimide blend was completed by heating the plasticized blend at 290°–300° C. for 2 hours in the presence of air to cure the N-unsaturated alkyl bisimide described above. The resulting rigid polyetherimide blend exhibited a glass transition temperature of 180° C. Of the rigid blend obtained, 45% was found to be insoluble in methylene chloride, which corresponded to the portion of polymerized N-unsaturated alkyl bisimide described above.

EXAMPLE 3

This example illustrates the preparation of 2,2-[4-phenyl-4-(N-2,3-propenyl phthalimide)ether]propane. To 50 grams (0.096 moles) 2,2-bis[4-(3,4-dicarboxyphenoxy)phenyl]propane anhydride were added 200 ml. methylene chloride at ambient temperature. Allyl amine (11.91 grams, 0.21 mole) was added dropwise rapidly over a period of 5 minutes. An exotherm was observed during the addition of allyl amine. After addition, the reaction mixture was refluxed for 4 hours. At the end of the reflux period, solvent and excess N-allyl amine were removed under vacuum while increasing the reaction temperature to 200° C. After all signs of water evolution disappeared, the molten N-unsaturated alkyl bisimide was poured into a tray to solidify. The product was a slightly yellow crystalline solid which was greater than 95% pure (high pressure liquid chromatography) and exhibited a melting point of about 80°–82° C. The isolated yield was about 92.0%.

Although the above examples have shown various modifications of the present invention, it should be understood that further modifications by one skilled in the art are possible in light of the above teachings without departing from the spirit and scope of this invention.

What is claimed is:

1. A method for plasticizing polyetherimide resin comprising:
   (a) adding to said polyetherimide resin an N-unsaturated alkyl bisimide of the formula,

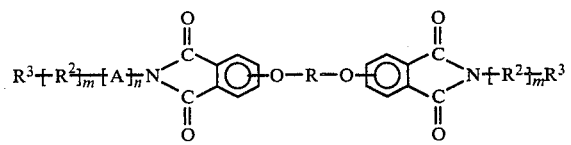

wherein n is a number having a value of from 0–3, m is equal to 0 or 1, R is a divalent aromatic radical of from 6–30 carbon atoms, A is of the formula

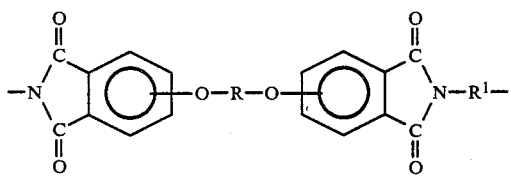

where R is as defined above and $R^1$ is a divalent organic radical selected from the group consisting of the aromatic radicals defined by R, alkylene radicals of from 1–20 carbon atoms, cycloalkylene radicals of from 4–20 carbon atoms and alkylene terminated polydiorganosiloxane radicals having from 2–8 carbon atoms, $R^2$ is a divalent organic radical selected from the group consisting of alkylene radicals of from 1–18 carbon atoms, cycloalkylene radicals of from 4–18 carbon atoms and aromatic radicals of from 6–18 carbon atoms, $R^3$ is an alkyl radical of from 2–20 carbon atoms having an unsaturated functional group selected from the group of the formulas consisting of

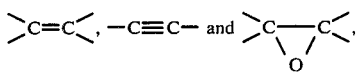

and (b) heating the components of step (a) with mixing until molten.

2. A method as in claim 1 wherein R is of the class consisting of

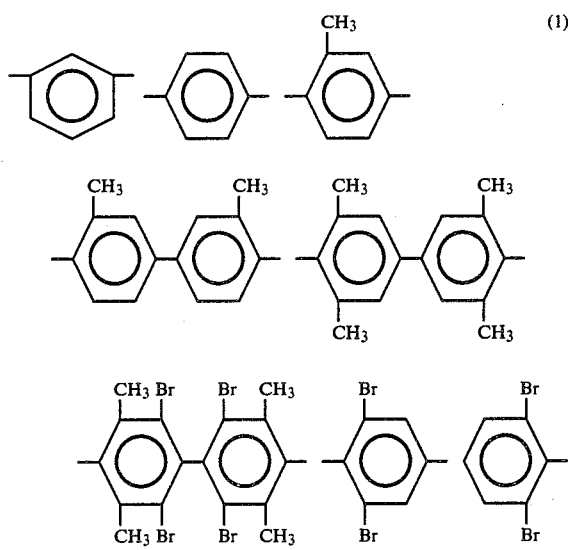

and (2) divalent organic radicals of the general formula

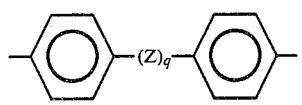

where Z is a member of the class consisting of divalent radicals of the formulas

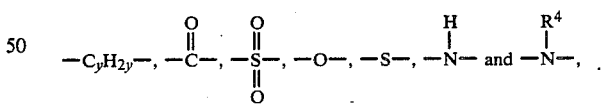

where q is equal to 0 or 1, y is a whole number of from 1–5 and $R^4$ is a monovalent organic radical of from 1–6 carbon atoms.

3. A method as in claim 2 wherein R and $R^1$ are divalent radicals of the formula

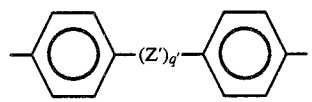

where Z' is a number of the class of divalent radicals of the formulas

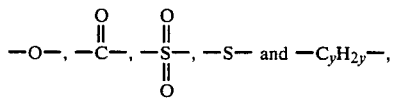

q' is equal to 0 or 1 and y is a whole number having a value of from 1-5.

4. A method as in claim 2 wherein m is 0, n is 0 and R is of the formula

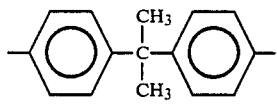

5. A method as in claim 1 wherein the components of step (a) are heated to a temperature in the range of 200°-300° C.

6. A method as in claim 1 wherein the components of step (a) are heated under an inert atmosphere.

7. A method as in claim 5 wherein heating is limited to a period of from 1-30 minutes.

8. A method as in claim 1 wherein the components of step (a) additionally comprise a solvent.

9. A method as in claim 8 wherein the solvent is selected from the group consisting of methylene chloride, chlorobenzene, o-dichlorobenzene, chloroform and toluene.

10. A method as in claim 2 wherein $R^3$ is of the formula $-C_wH_{2w})_fX$, where w is a whole number from 1-5, f is equal to 0 or 1 and X is an unsaturated function group selected from the group consisting of —C≡C—H, —HC=CH$_2$ and

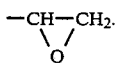

11. A method for plasticizing polyetherimide resin comprising
(a) adding to said polyetherimide resin an N-unsaturated alkyl bisimide of the formula

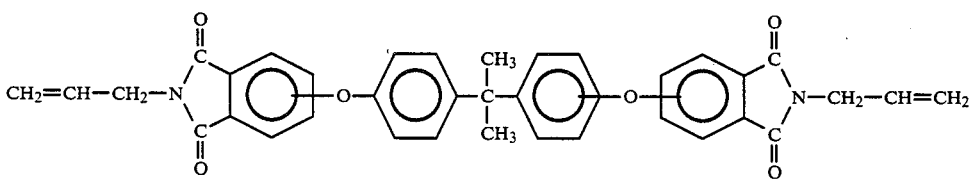

and
(b) heating the components of step (a) with mixing until molten.

12. A plasticized polyetherimide blend comprising a homogeneous mixture of:
(a) a polyetherimide of the formula

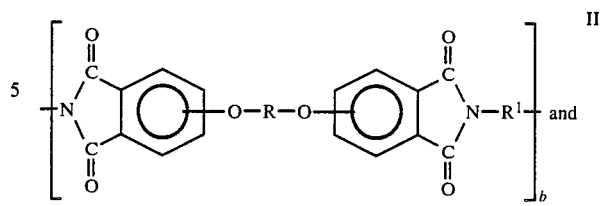

(b) an N-unsaturated alkyl bisimide of the formula

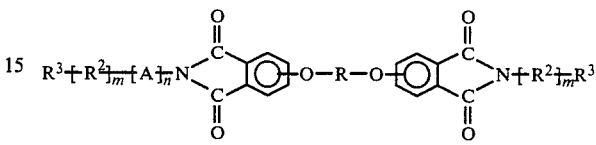

wherein R is a divalent aromatic radical of from 6-30 carbon atoms, A is of the formula

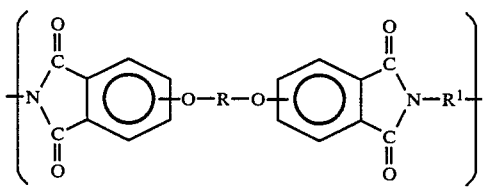

where R is as defined above, $R^1$ is a divalent organic radical selected from the group consisting of R radicals, alkylene radicals of from 1-20 carbon atoms, cycloalkylene radicals of from 6-20 carbon atoms and alkylene terminated polydiorganosiloxane radicals having from 2-8 carbon atoms, $R^2$ is a divalent organic radical selected from the group consisting of alkylene radicals of from 1-18 carbon atoms, cycloalkylene radicals of from 4-18 carbon atoms and aromatic radicals of from 6-18 carbon atoms, $R^3$ is an alkyl radical of from 2-20 carbon atoms having an unsaturated functional group selected from the group of formulas consisting of

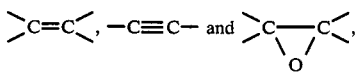

b is a whole number in excess of 1, and n is a number of from 0-3 and m is equal to 0 or 1.

13. A plasticized polyetherimide blend of claim 12 wherein R is a member of the class consisting of

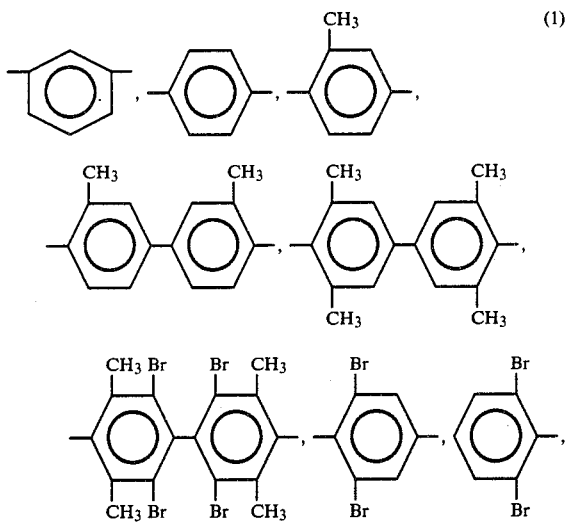

and (2) divalent organic radicals of the general formula

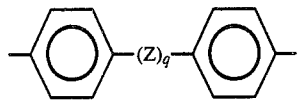

where Z is a member selected from the class consisting of divalent radicals of the formulas

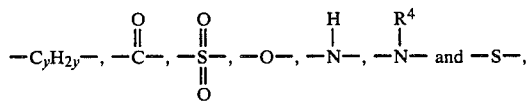

where q is equal to 0 or 1, y is a whole number from 1–5 and $R^4$ is a monovalent radical of from 1–6 carbon atoms.

14. A plasticized polyetherimide blend of claim 12 wherein R and $R^1$ are of the formula

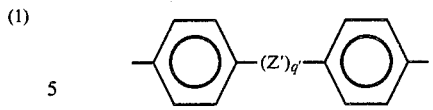

wherein Z' is a member of the class of divalent radicals of the formulas,

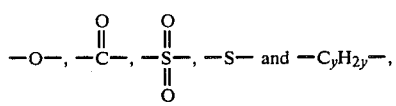

q' is equal to 0 or 1 and y is a whole number of from 1–5.

15. A plasticized polyetherimide blend as in claim 13 wherein m is 0, n is 0 and R is of the formula

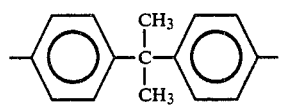

16. A plasticized polyetherimide blend as in claim 15 wherein $R^3$ is of the formula $-C_wH_{2w})_fX$, where w is a whole number of from 1–5, f is equal to 0 or 1 and X is an unsaturated function group selected from the group consisting of

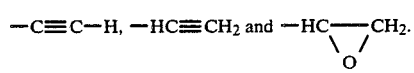

17. A plasticized polyetherimide blend as in claim 12 which exhibits a glass transition temperature in the range of 180° C.–198° C.

18. A plasticized polyetherimide blend of claim 12 wherein the polyetherimide:N-unsaturated alkyl bisimide weight ratio falls within the range of 1:99 to 99:1.

19. A plasticized polyetherimide blend of claim 15 wherein the polyetherimide:N-unsaturated alkyl bisimide weight ratio falls within the range of 99:1 to 1:1.5.

20. A plasticized polyetherimide blend comprising a homogeneous mixture of (a) a polyetherimide of the formula,

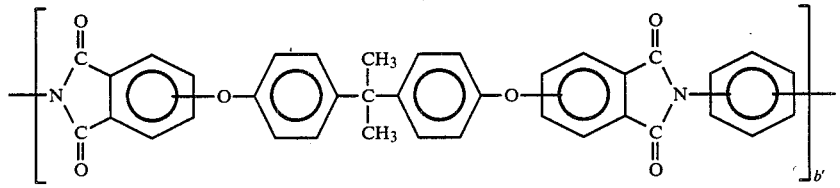

wherein b' is a whole number having a value in the range of 20–50 and (b) an N-unsaturated alkyl bisimide of the formula

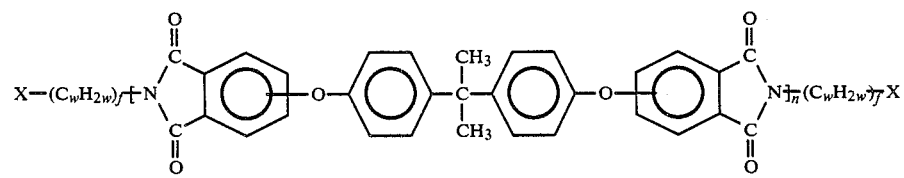

wherein w is a whole number of from 1–5 inclusive, f is equal to 0 or 1 and X is an unsaturated functional group selected from the group consisting of

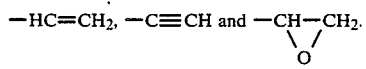

21. A plasticized polyetherimide blend as in claim 20 wherein the N-unsaturated alkyl bisimide is 2,2-bis-[4-phenyl,4-(N-2,3-propenyl phthalimide)ether]propane.

22. A rigid polyetherimide blend obtained by
    (a) forming a mixture comprised of
        (i) a polyetherimide utilized in a plasticized polyetherimide blend of claim 12 and
        (ii) an N-unsaturated alkyl bisimide utilized in a plasticized polyetherimide blend of claim 12 and
    (b) polymerizing the N-unsaturated alkyl bisimide within the mixture.

23. A rigid polyetherimide blend of claim 22 where the mixture formed is homogeneous.

24. A rigid polyetherimide blend obtained by polymerizing the N-unsaturated alkyl bisimide within a plasticized polyetherimide blend of claim 13.

25. A rigid polyetherimide blend obtained by polymerizing the N-unsaturated alkyl bisimide within a plasticized polyetherimide blend of claim 15.

26. A rigid polyetherimide blend of claim 25 wherein the N-unsaturated alkyl bisimide is polymerized by heating the plasticized polyetherimide blend to a temperature above about 200° C. for a period of at least 15 minutes.

27. A rigid polyetherimide blend as in claim 25 wherein $R^3$ is of the formula $-(C_wH_{2w})_fX$, where w is a whole number of from 1–5, f is equal to 0 or 1 and X is an unsaturated function group selected from the group consisting of

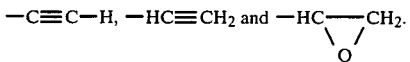

28. A rigid polyetherimide blend of claim 25 wherein the N-unsaturated alkyl bisimide is 2,2-bis-[4-phenyl,4-(N-2,3-propenyl phthalimide)ether]propane.

29. A rigid polyetherimide blend of claim 25 wherein the polyetherimide:N-unsaturated alkyl bisimide weight ratio falls within the range of 1:99 to 99:1.

30. A rigid polyetherimide blend of claim 25 wherein the polyetherimide:N-unsaturated alkyl bisimide weight ratio falls within the range of 99:1 to 1:1.5.

31. A rigid polyetherimide blend of claim 25 additionally comprising up to 50% by weight fillers.

32. A rigid polyetherimide blend of claim 31 wherein the fillers are selected from the group consisting of clay, silica, calcium carbonate, aluminum trihydrate, carbon black, talc, calcium sulfate and wollastonite.

33. A rigid polyetherimide blend of claim 32 wherein the fillers are in the form of a fiber matrix.

34. A rigid polyetherimide blend of claim 25 wherein the N-unsaturated alkyl bisimide is polymerized with the aid of a thermal-curing catalyst.

* * * * *